(12) United States Patent
Naimin et al.

(10) Patent No.: US 11,113,871 B1
(45) Date of Patent: Sep. 7, 2021

(54) SCENE CROP VIA ADAPTIVE VIEW-DEPTH DISCONTINUITY

(71) Applicant: Autodesk, Inc., San Rafael, CA (US)

(72) Inventors: Koh Naimin, Singapore (SG); Li Jiang, Singapore (SG)

(73) Assignee: AUTODESK, INC., San Rafael, CA (US)

( * ) Notice: Subject to any disclaimer, the term of this patent is extended or adjusted under 35 U.S.C. 154(b) by 16 days.

(21) Appl. No.: 16/800,334

(22) Filed: Feb. 25, 2020

(51) Int. Cl.
*G06T 15/30* (2011.01)
*G06T 7/593* (2017.01)
*H04N 13/271* (2018.01)

(52) U.S. Cl.
CPC .............. *G06T 15/30* (2013.01); *G06T 7/593* (2017.01); *H04N 13/271* (2018.05); *G06T 2207/10028* (2013.01); *G06T 2210/22* (2013.01)

(58) Field of Classification Search
None
See application file for complete search history.

(56) References Cited

U.S. PATENT DOCUMENTS

| | | | | |
|---|---|---|---|---|
| 9,477,368 B1* | 10/2016 | Filip | ........................ | G06F 3/048 |
| 9,996,944 B2* | 6/2018 | Aghamohammadi | .... | G06T 7/55 |
| 10,484,663 B2* | 11/2019 | Li | ........................ | H04N 13/243 |
| 10,902,607 B1* | 1/2021 | Lee | ........................ | G06T 1/20 |
| 2005/0162445 A1* | 7/2005 | Sheasby | .................. | G06T 11/60 |
| | | | | 345/620 |
| 2012/0007943 A1* | 1/2012 | Tytgat | .................... | G01B 11/22 |
| | | | | 348/14.08 |
| 2020/0357172 A1* | 11/2020 | Lee | ........................ | G06T 19/00 |

* cited by examiner

*Primary Examiner* — Jason A Pringle-Parker
(74) *Attorney, Agent, or Firm* — Gates & Cooper LLP

(57) ABSTRACT

A method, apparatus, and system provide the ability to crop a three-dimensional (3D) scene. The 3D scene is acquired and includes multiple 3D images (with each image from a view angle of an image capture device) and a depth map for each image. The depth values in each depth map are sorted. Multiple initial cutoff depths are determined for the scene based on the view angles of the images (in the scene). A cutoff relaxation depth is determined based on a jump between depth values. A confidence map is generated for each depth map and indicates whether each depth value is above or below the cutoff relaxation depth. The confidence maps are aggregated into an aggregated model. A bounding volume is generated out of the aggregated model. Points are cropped from the scene based on the bounding volume.

18 Claims, 10 Drawing Sheets

SCENE CROP VIA ADAPTIVE VIEW-DEPTH DISCONTINUITY

BACKGROUND OF THE INVENTION

1. Field of the Invention

The present invention relates generally to image processing, and in particular, to a method, system, apparatus, and article of manufacture for an adaptively cropping depth-based images.

2. Description of the Related Art

Images often contain distant or non-subject objects. The problem becomes how to effectively and efficiently crop such objects out of the images. To better understand this problem, a description of image reconstruction and cropping may be useful.

Three-dimensional scenes may often be constructed/reconstructed using various photogrammetry/point cloud processing techniques. In particular, multiple cameras/point cloud scanners (e.g., laser scanners) may capture images of a scene that are then combined to create the 3D scene. Each captured image has associated depth data identifying the depth from the camera/scanner origin to the object in the scene. There are often three different views that are captured: (1) Nadir (top-down view); (2) Oblique (slanted view); and (3) Façade (frontal view). FIGS. 1A-1C illustrate a Nadir, Oblique, and Façade view respectively captured from multiple cameras. The Nadir top down view of FIG. 1A illustrates the cameras 102 positioned overhead capturing images of the subject regions 104 and background areas 106. FIG. 1B illustrates an oblique view with the cameras 102 positioned at oblique angles towards the subject regions 104. As illustrated in FIG. 1B, portions of the background 106 are captured by cameras 102. FIG. 1C illustrates a façade view where cameras 102 are positioned at angles to capture a side face of the subject region 104 (e.g., parallel to the ground and/or from a view pointing towards the horizon). As illustrated in FIG. 1C, the cameras 102 capture portions of the background 106.

The three different views in FIGS. 1A-1C illustrate the different amounts of background 106 in a 3D image that are desirable to remove. In particular, while the Nadir view of FIG. 1A generally contains only the subject region, oblique (FIG. 1B), and façade (FIG. 1C) tend to also include the distant background objects 106 such as trees, mountains, or other buildings. It is desirable to provide the ability to robustly and automatically detect and remove such background objects while keeping the subject element(s) intact.

Some prior art techniques (for removing unwanted background elements) merely provide the raw uncropped images and require users to manually remove/clean-up an image (i.e., a user must manually delete the unwanted regions from an image reconstruction). For example, FIG. 2A illustrates an uncropped oblique scene in accordance with the prior art. Some of the excess/undesirable background material 202 has been indicated in FIG. 2A.

FIG. 2B illustrates an uncropped orthoimage of an oblique shots profile scene in accordance with the prior art. As illustrated in FIG. 2B, the background highway 204 and surrounding structures 206 are all badly reconstructed, since they are only caught in the peripheral sight of a photo set. Prior art systems require the manual clean-up/removal of such unwanted background 202-206.

Alternative prior art techniques may use a camera position-based cropping mechanism. However, while such a camera position-based cropping may work for Nadir shots, it is unable to correctly handle oblique or façade shots. Specifically, because such a mechanism only relies on creating a convex hull from the XY projection of the camera position, it is unable to account for view-depth information resulting in over-cropping (only points near the camera are kept but not those the camera is actually looking at).

In view of the above, what is needed is a method and system that can robustly and automatically detect and remove background objects (e.g., in oblique and façade shots) while keeping a subject element intact.

SUMMARY OF THE INVENTION

Embodiments of the invention utilize the depth map of each view of an image/camera. Specifically, a cutoff depth is determined within each view point such that any depth beyond the cutoff is marked as a low confidence point. When all of the views are aggregated into a singular model, the confidence score of each 3D point is combined and any points with a confidence score below a threshold value is discarded. Accordingly, distant objects seen by each camera are removed while still correctly/accurately keeping high confidence subject elements intact.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Logical Flow

Figure 3:
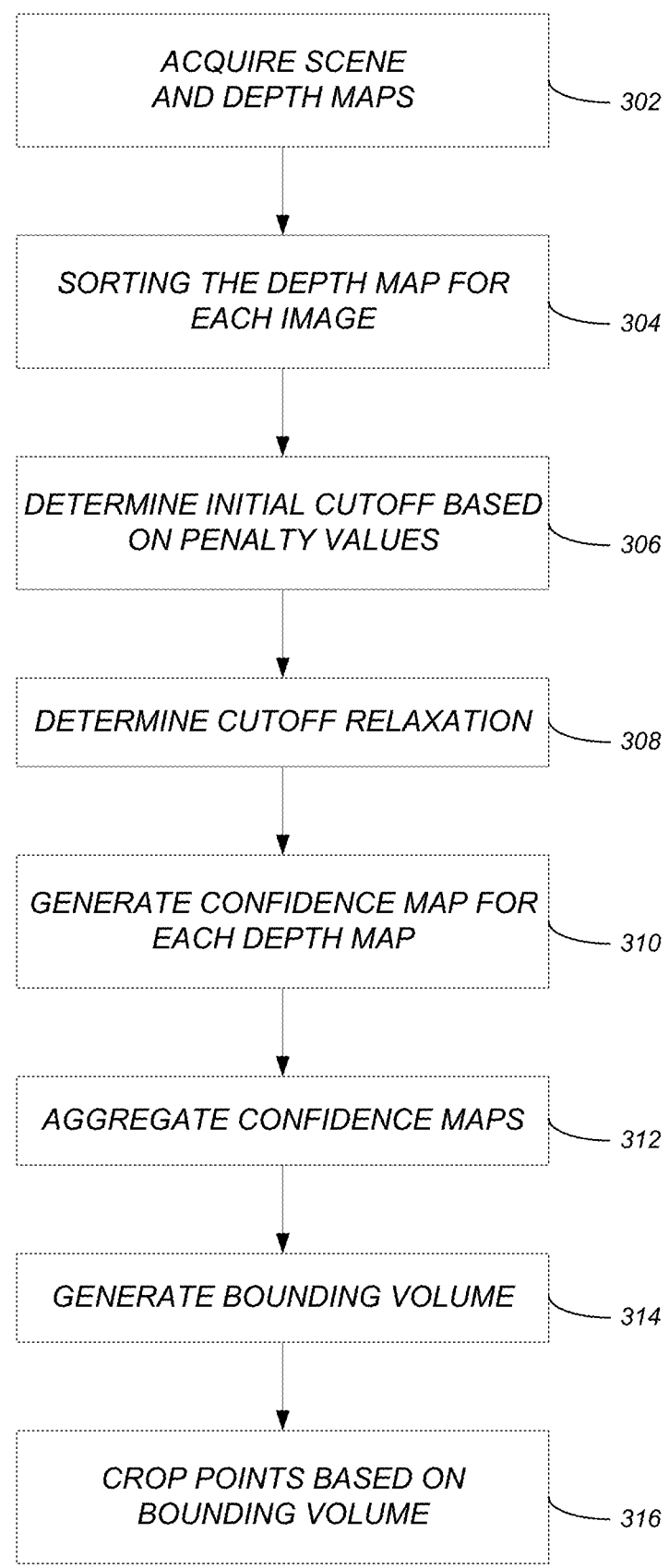
FIG. 3 illustrates the logical flow for cropping a three-dimensional (3D) scene in accordance with one or more embodiments of the invention.

FIG. 3 illustrates the logical flow for cropping a three-dimensional (3D) scene in accordance with one or more embodiments of the invention.

At step 302, the 3D scene is acquired. The 3D scene consists of multiple 3D images, with each 3D image captured from a view angle of an image capture device. Such an image capture device may be a camera capturing an image or may be a laser scanner capturing a point cloud. The 3D scene also includes a depth map for each 3D image. The depth map includes two or more depth values, with each of the two or more depth values measured from the image capture device to an object in the 3D image (i.e., from the point of view of the image capture device). In one or more embodiments, the 3D scene further includes a position, a direction, and distortion information for the image capture device of each 3D image. Further, the (adaptive) view angle may be determined based on a down vector corresponding to each 3D image.

At step 304, the two or more depth values for/within each 3D image are sorted (resulting in a sorted depth map for each image).

At step 306, multiple initial cutoff depths are determined. Each of the multiple initial cutoff depths is based on the view angle. The multiple initial cutoff depths may be determined based on/using/by determining, for each view angle, a cutoff penalty. As the view angle moves from a Nadir view to an oblique view to a façade view, the cutoff penalty increases. Thereafter, each initial cutoff depth is adjusted based on the cutoff penalty. In one or more embodiments, user input may be accepted to adjust the scale penalty as desired (e.g., using a slider, direct input of numbers, and/or other user interface widget).

At step 308, a cutoff relaxation depth is determined. The cutoff relaxation depth is based on a jump, between two of the two or more depth values, that exceeds a jump threshold. In one or more embodiments, the jump may be determined based on a second derivative of a line between two adjacent depth values in the sorted depth map.

Figure 4:
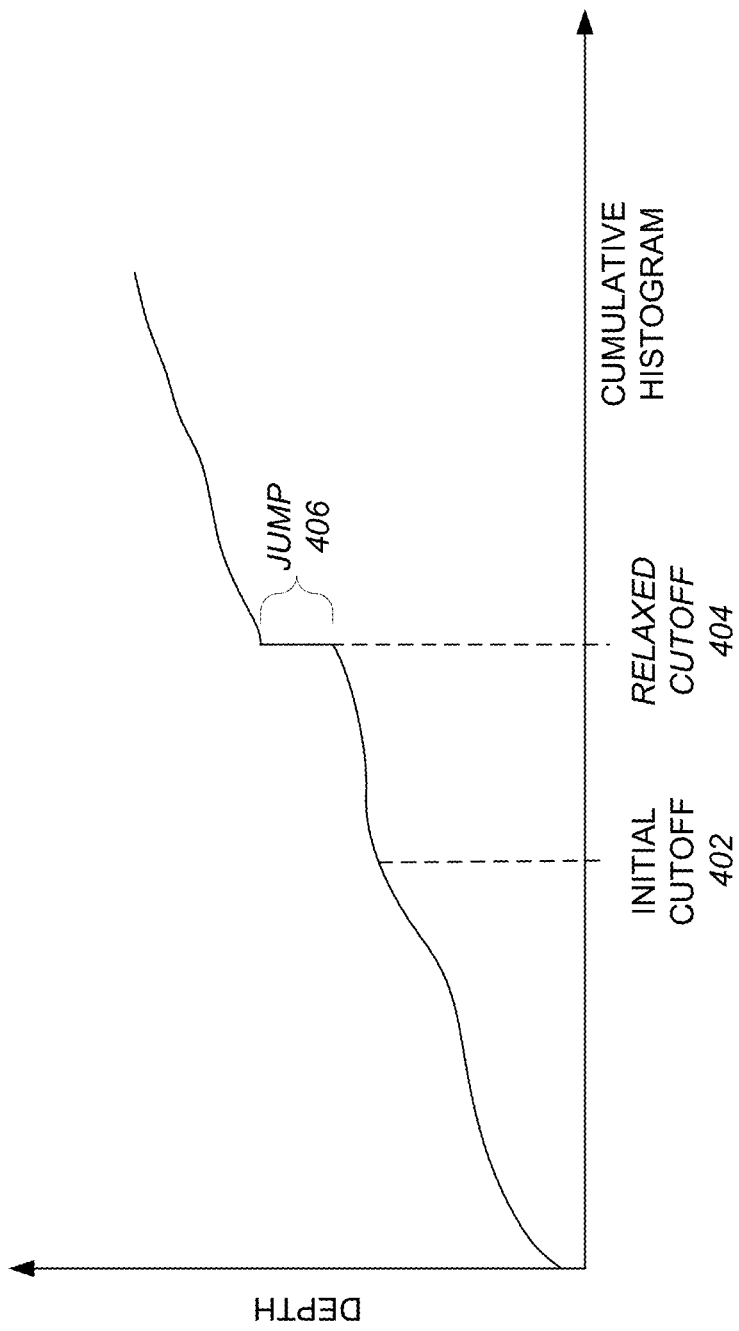
FIG. 4 illustrates a graph of ascending sorted list of depth values in accordance with one or more embodiments of the invention.

Steps 306 and 308 may be easier to understand with an illustration of a graph for an ascending sorted list of depth values. FIG. 4 illustrates a graph of ascending sorted list of depth values (e.g., a statistical depth cutoff histogram that reflects cutoff values on the x-axis based on depth values on the y-axis) in accordance with one or more embodiments of the invention. The basic idea is to determine from each view, what portion of the scene belongs to the subject and what belongs to the background. Instead of using a computer vision classification method (of the prior art), embodiments of the invention utilize a statistical approach. Given the ascending sorted list of the depth values in a single depth map (e.g., for each 3D image) (i.e., the sorted depth map from step 304), a cutoff point is estimated on the sorted list. Any points beyond this cutoff point/depth is considered low confidence and a candidate for removal/cropping.

Figure 1A:
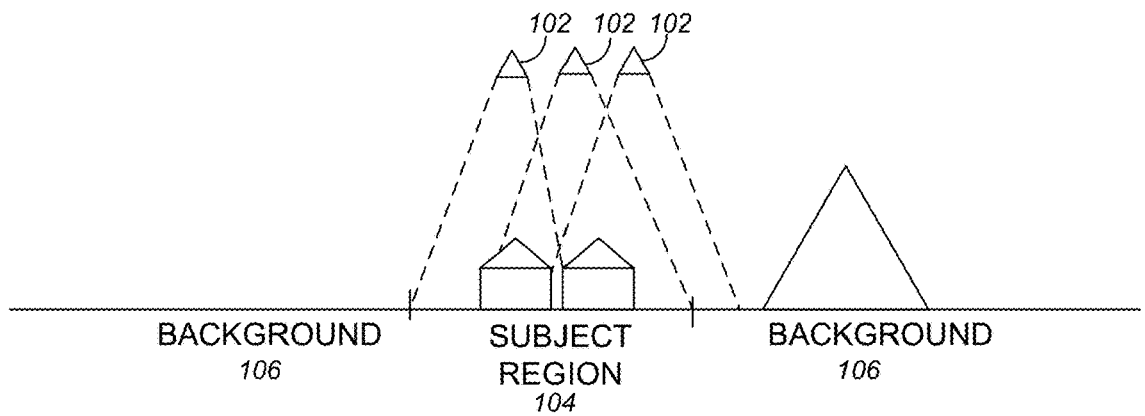
FIGS. 1A-1C illustrate a Nadir, Oblique, and Façade view respectively captured from multiple cameras.
Figure 1B:
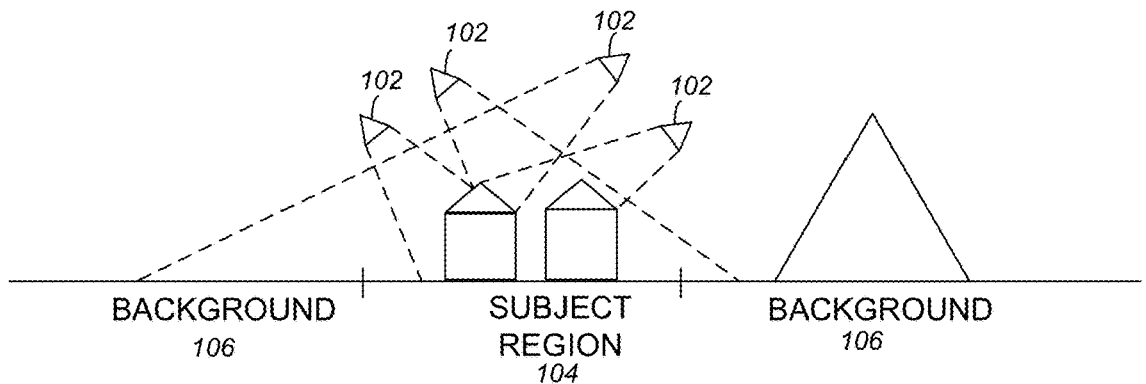
Figure 1C:
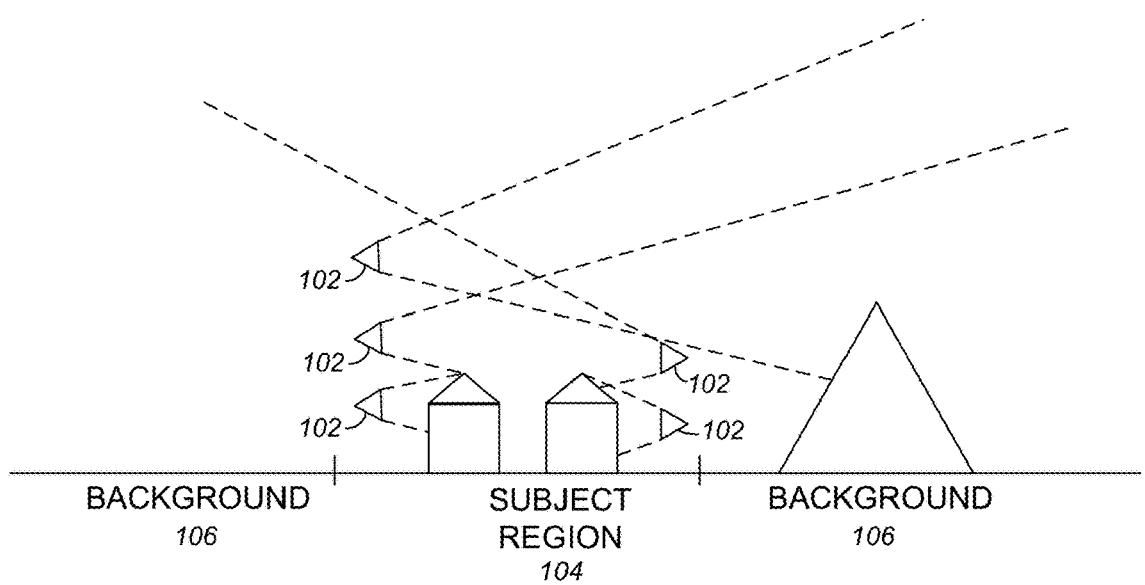

The estimation method may be based on an adaptive view penalty and the view angles described in FIGS. 1A, 1B, and 1C. Due to the nature of Nadir (FIG. 1A), oblique (FIG. 1B), and façade (FIG. 1C) view/shot, embodiments of the invention apply different cutoff penalties depending on the view (i.e., the penalty is adaptive/adapts to the view angle). Using a predefined down vector (e.g., that may be acquired as part of the 3D scene), the angle between the image capture device's 102 view direction with the down vector may be computed to determine the "Nadir"-ness of the image capture device 102 view. As the view angle moves away from the "Nadir" direction (i.e., towards the façade direction), a larger depth penalty is applied. The rationale for such a varying depth penalty follows.

Generally, a Nadir shot/view, being a top down view of the area, does not include extra depth related background. Hence, there is no need to apply any (or a minimum amount) of depth penalty for a Nadir shot/view. However, oblique (slanted view) and façade (frontal view) will usually also include the background in the captured image/point cloud. This disparity in view-depth of subject and background is the criteria embodiments of the invention utilize as the depth cutoff.

A simpler way to visualize the above, is to start by looking at the ground, then slowly rise the view towards the horizon. While directly looking at the ground, the range of the depth captured is basically the distance from the eye to the ground. However, as the view rises towards the horizon, the range of the depth increases towards infinity (the horizon). So as the view moves towards the horizon, it is desirable to more dramatically increase the penalty, in order to discard the far-off depth ranges.

Returning to FIG. 4, based on a profile of the image capture device (e.g., the different view angles), the initial cutoff 402 with penalties is determined (i.e., at step 306). However, it is undesirable to arbitrarily choose a depth cutoff and just discard any point not in the range. In this regard, using an arbitrary depth cutoff will incorrectly discard valid depth ranges. For example, with a penalty cutoff of 50%, 50% of all points would be discarded regardless of whether they are valid or not (e.g., ½ of an image of a hallway could be lost). Accordingly, it is desirable to keep the connected parts of the subject/object/element in the image where the cutoff depth falls on.

Accordingly, at step 308, a cutoff relaxation is utilized that seeks to relax the cutoff point until a sharp change in depth value is detected. Such a sharp change in depth value signals a jump 406 in depth value that can only occur if two objects are not connected. For example, think of a building in front and a building behind it—as the initial cutoff depth 402 is relaxes, a sharp change in depth value will eventually be encountered as the depth jumps 406 from the front building to the building behind.

Due to the wildly different size of the scenes and by extension the ranges of the depth, embodiments of the invention don't simply use a constant difference in depth or even the gradient to determine sharp changes. Accordingly, embodiments of the invention may use a second derivative (acceleration) of the sorted depth values (e.g., of a line connecting two adjacent depth values) to determine if a sharp change in depth has occurred (considering both the scale and perspective increase in depth value in the scene). Alternative embodiments may utilize any method that is capable of detecting an abnormality in the depth values. For example, machine learning may be used to detect when there is a change in depth values (e.g., via a feedback loop that evaluates the depth change/jump between objects to determine a sufficient minimum threshold representing two different objects [e.g., that may be combined with user input/image recognition validating threshold values—once a sufficient number of image recognition iterations have been performed, the machine learning has an established threshold that can be used to detect the change in depth values).

Returning to FIG. 3, at step 310, a confidence map is generated for each depth map. The confidence map indicates whether each depth value is above or below the cutoff relaxation depth. In one or more embodiments, the confidence map is generated by passing through each depth map and marking each pixel as a high confidence or a low confidence. Specifically, the pixel is marked as a high confidence if a corresponding depth value is below the cutoff relaxation depth, and the pixel is marked as a low confidence if the corresponding depth value is above the cutoff relaxation depth (i.e., pixels that fall outside of the cutoff). The result is a new confidence map of the current view.

Just because a single view marked a point as low confidence does not mean that it is guaranteed to be low confidence for each view. Because the same 3D point can be again marked as high confidence from the point of view of another image capture device. Accordingly, at step 312, an aggregated model is generated. The aggregated model combines/aggregates the confidence maps for all of the 3D images in the 3D scene. To generate the aggregated model, one or more embodiments aggregate projected 3D points of each 3D image. Confidence values, from the confidence maps, for each projected 3D point are summed up in the aggregated model. Alternatively, rather than adding all of the confidence values, an average of the confidence scores (or other computational method) may be used. Projected 3D points with respective aggregated confidence values below a confidence threshold are then removed from the aggregated model.

Figure 5:
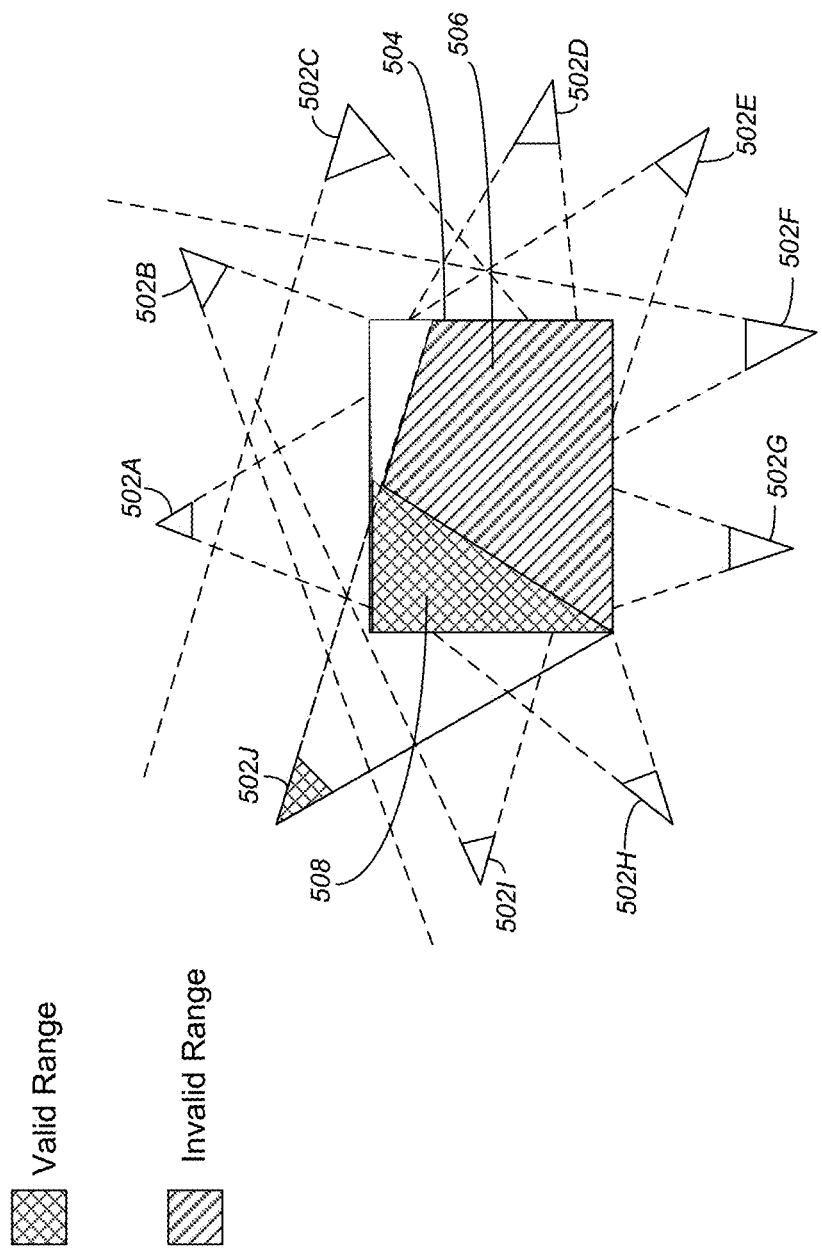
FIG. 5 illustrates an aggregation of various confidence maps in accordance with one or more embodiments of the invention.

FIG. 5 illustrates an aggregation of various confidence maps in accordance with one or more embodiments of the invention. The image capture devices 502 (image capture devices 502A-502J are collectively referred to as image capture devices 502) show the different views (depicted by the dashed lines) of the area 504 that is captured. Accordingly, an aggregation of all of the projected 3D points of each views is conducted and the confidence scores are summed up. This way, any point with a sufficient confidence score (e.g., above a confidence threshold; e.g., "3" and/or above a confidence ratio) are still considered high confidence. Conversely, a previously marked high confidence point in a single view that might not have enough support from other views will still be discarded. In FIG. 5, it may be noted that the invalid range 506 is actually a valid range of other views (e.g., view 502D, 502E, 502F, and 502G) (i.e., the low confidence area 506 [based on image capture device 502J] is actually a strongly supported high confidence zone of other views [e.g., of image capture devices 502D-G]). Similarly, the valid range 508 (i.e., to image capture device 502J) may be an invalid range to other image capture devices (e.g., image capture devices 502D, 502E, and 502F).

At step 314, a bounding volume (e.g., a convex hull) is generated out of the aggregated model. During the generation of the bounding volume, user input may be accepted that scales the bounding volume as desired. In this regard, while the aggregated model only contains the high confidence points, removing all low confidence points will inevitably remove some valid points within the valid regions (e.g., points in the middle of the 3D image). To preserve the points within the valid depth ranges, a bounding volume is generated out of the aggregated model. This bounding volume will then be used to crop out any exterior points from the original scene's model. The remaining portion of the scene after cropping will be the subject region with most of the background elements removed.

At step 316, points from the 3D scene are cropped/cropped out based on the bounding volume. Further to the above, but for the scaling or particular user based actions described, steps 302-316 are performed in an automated/autonomous manner (e.g., without additional user input).

Figure 2A:
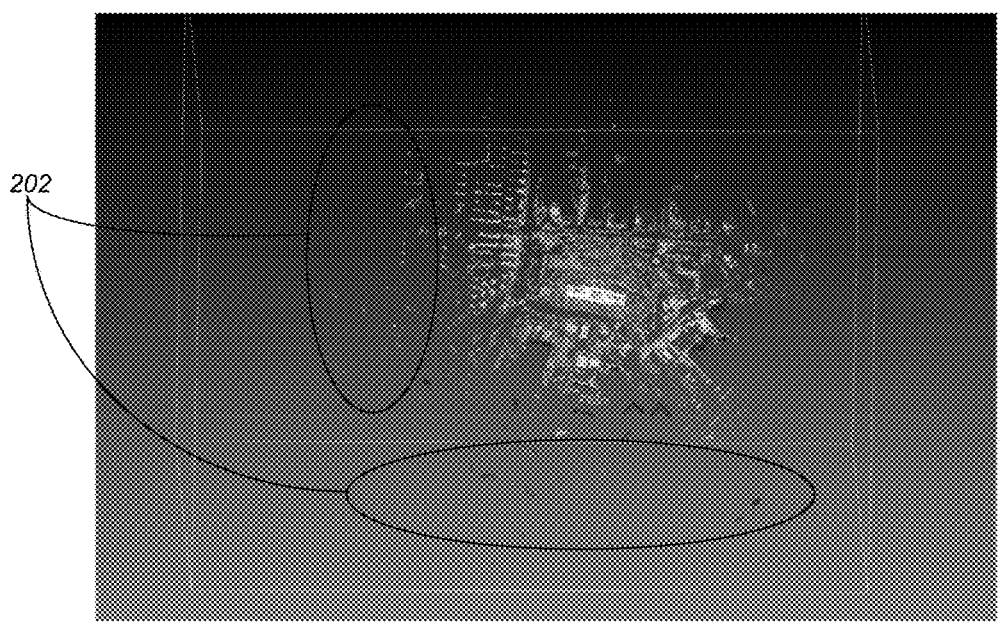
FIG. 2A illustrates an uncropped oblique scene in accordance with the prior art.
Figure 6:
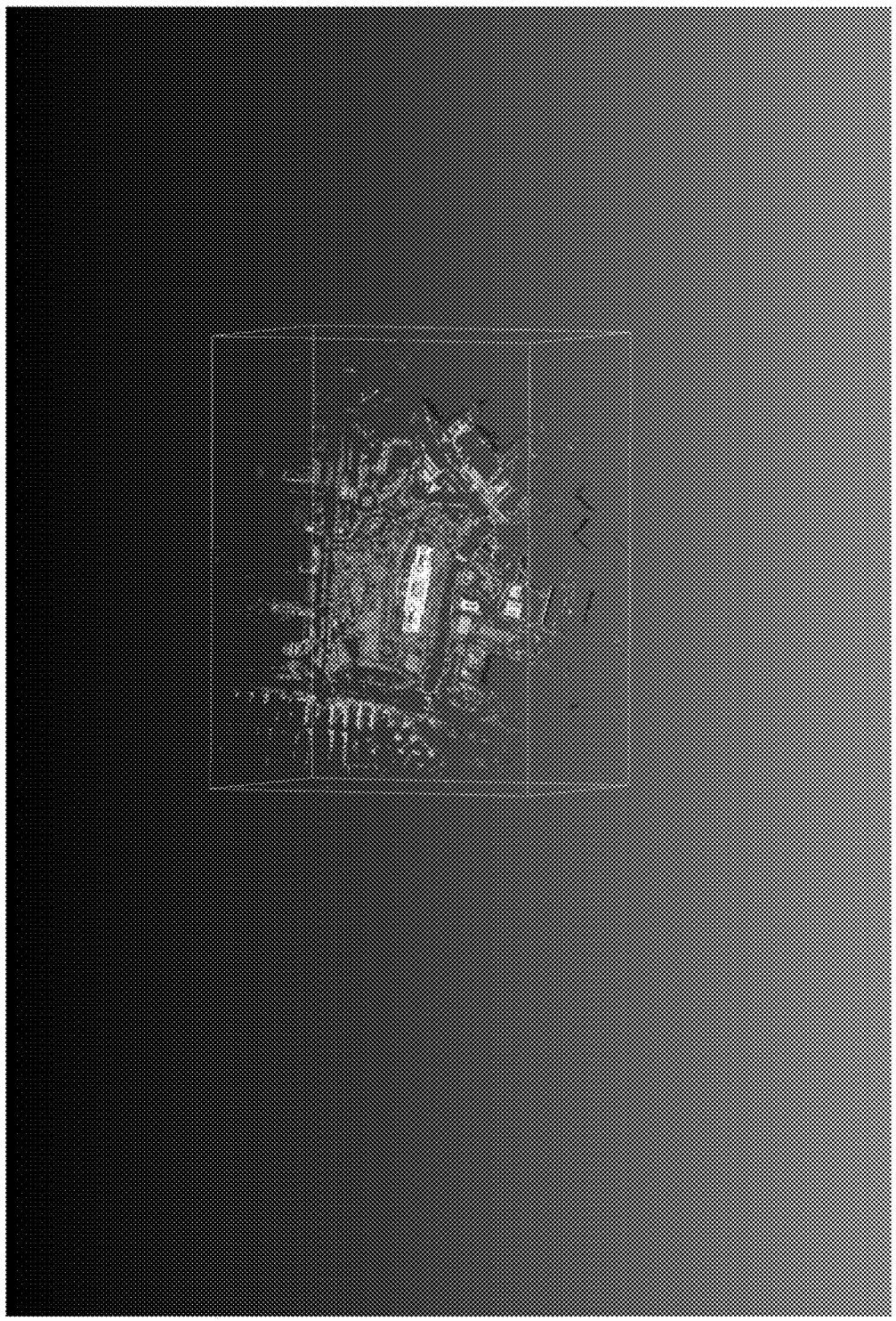
FIG. 6 illustrates a cropped oblique scene of the uncropped oblique scene of FIG. 2A in accordance with one or more embodiments of the invention.

FIG. 6 illustrates a cropped oblique scene of the uncropped oblique scene of FIG. 2A in accordance with one or more embodiments of the invention. As illustrated, the background objects 202 from the uncropped scene of FIG. 2A have been cropped out (in accordance with the steps described above) resulting in the scene depicted in FIG. 6.

Figure 2B:
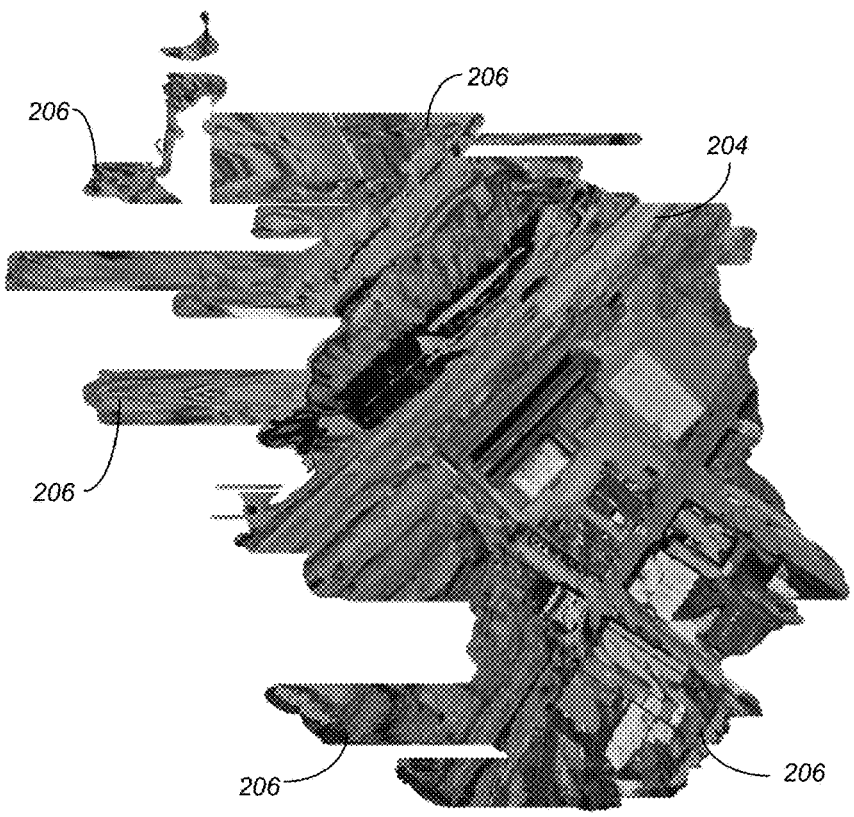
FIG. 2B illustrates an uncropped orthoimage of an oblique shots profile scene in accordance with the prior art.
Figure 7:
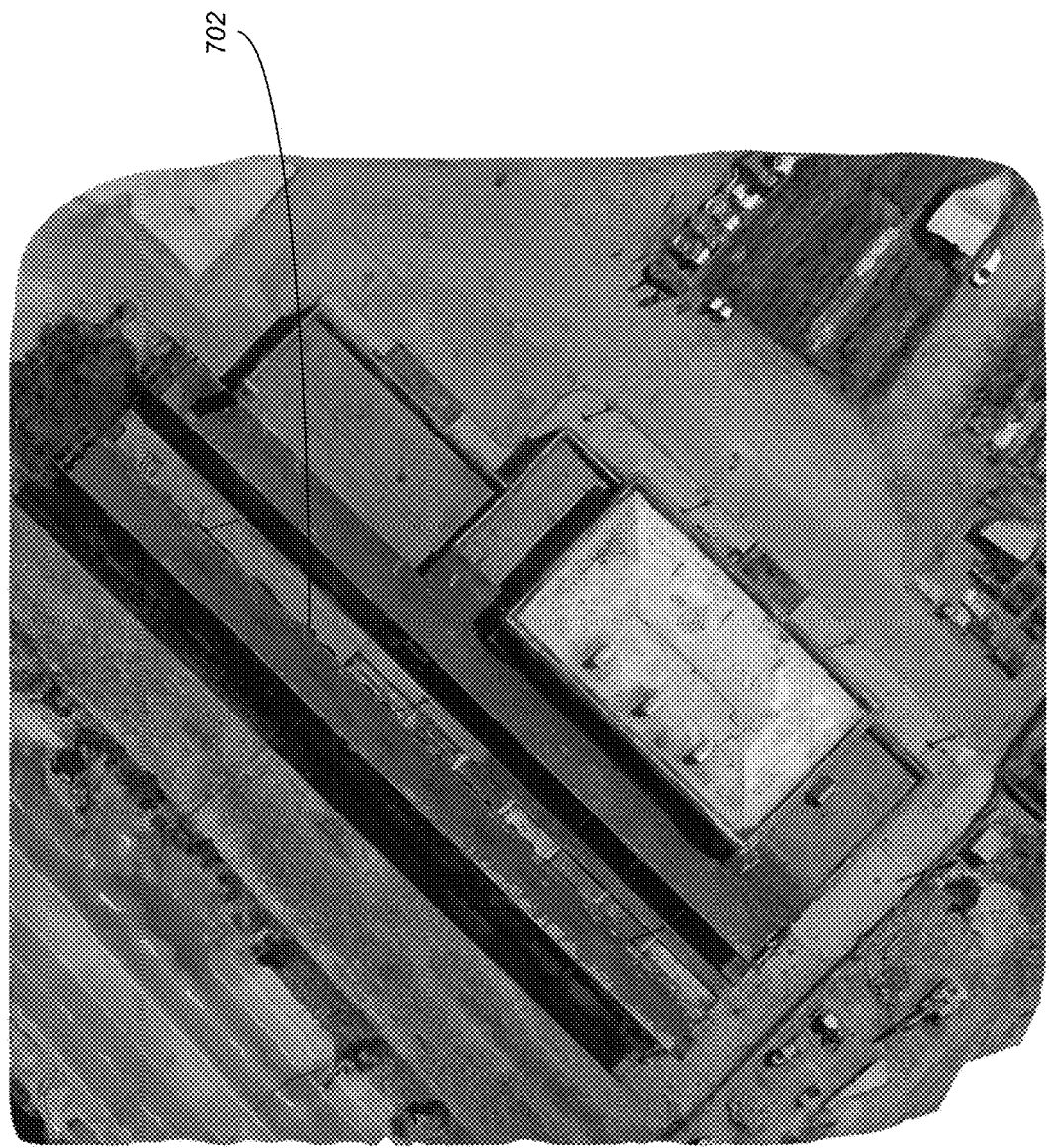
FIG. 7 illustrates a bounding box cropped orthoimage of the oblique shots profile scene of FIG. 2B in accordance with one or more embodiments of the invention.
Figure 8:
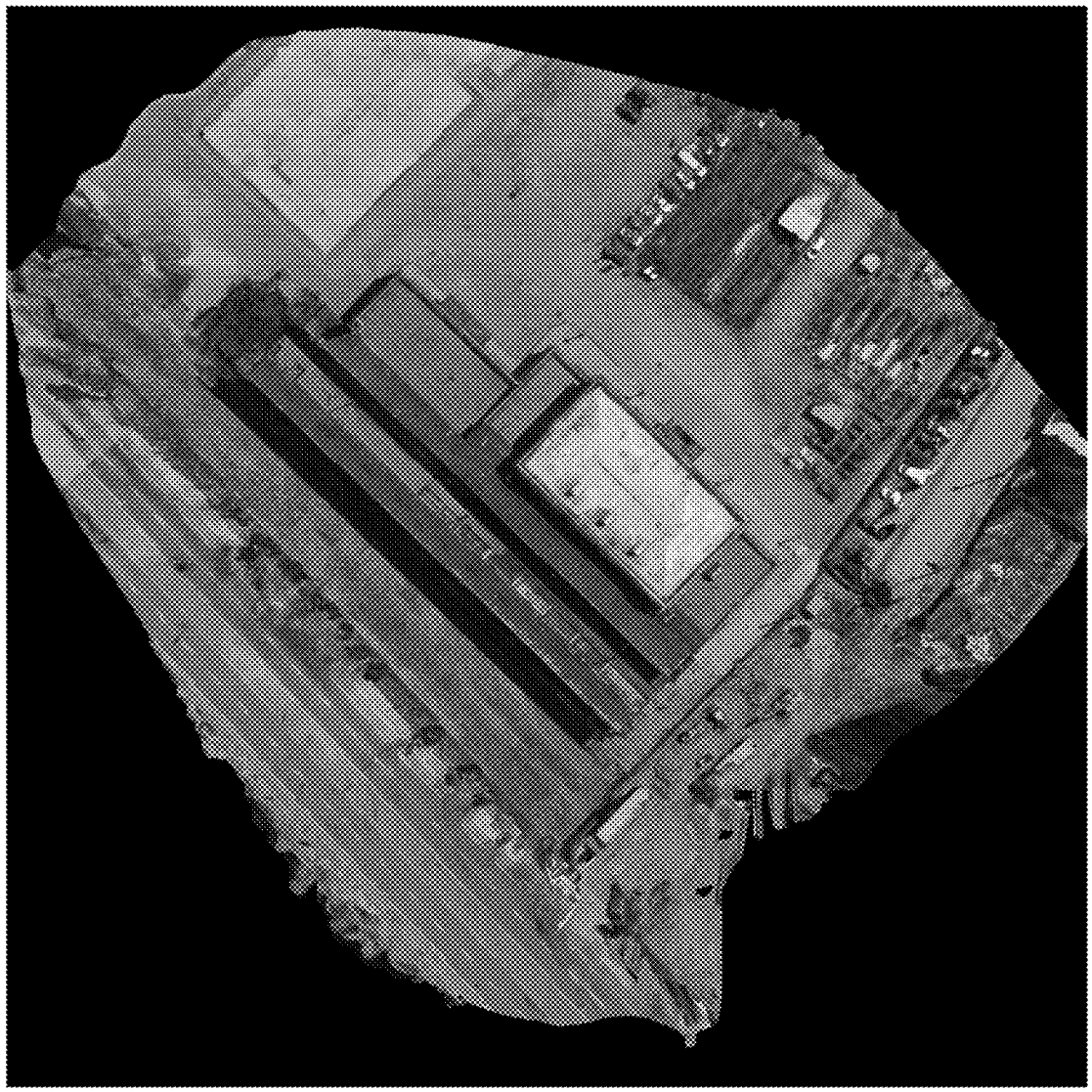
FIG. 8 illustrates a convex hull cropped orthoimage of the oblique shots profile scene of FIG. 2B in accordance with one or more embodiments of the invention.

FIG. 7 illustrates a bounding box cropped orthoimage of the oblique shots profile scene of FIG. 2B in accordance with one or more embodiments of the invention. As illustrated in FIG. 7, a bounding box is used as the bounding volume to crop the image. As a result, the subject train station 702 has been captured and the extra background highway and carpark have been removed. Using a different bounding volume, FIG. 8 illustrates a convex hull cropped orthoimage of the oblique shots profile scene of FIG. 2B in accordance with one or more embodiments of the invention. In FIG. 8, a convex hull is used as the bounding volume to crop the image and as a result, additional objects/points from the original image of FIG. 2B are not cropped out. Embodiments of the invention are not intended to be limited to a bounding box or convex hull as the bounding volumes; any geometric shape may be used as the bounding volume as long as it captures/bounds the high confidence pixels in the aggregated model.

Hardware Environment

Figure 9:
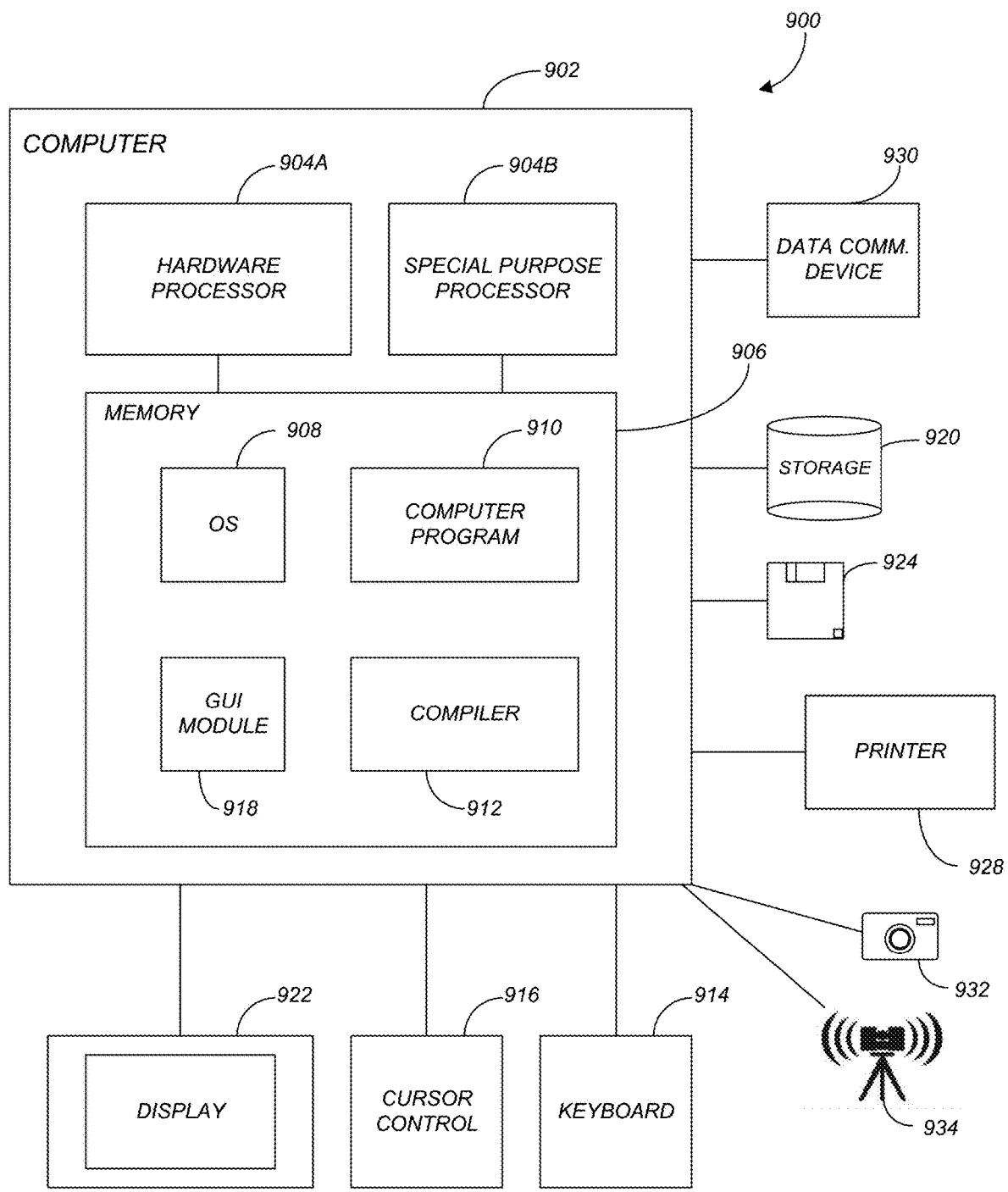
FIG. 9 is an exemplary hardware and software environment used to implement one or more embodiments of the invention.

FIG. 9 is an exemplary hardware and software environment 900 (referred to as a computer-implemented system and/or computer-implemented method) used to implement one or more embodiments of the invention. The hardware and software environment includes a computer 902 and may include peripherals. Computer 902 may be a user/client computer, server computer, or may be a database computer. The computer 902 comprises a hardware processor 904A and/or a special purpose hardware processor 904B (hereinafter alternatively collectively referred to as processor 904) and a memory 906, such as random access memory (RAM). The computer 902 may be coupled to, and/or integrated with, other devices, including input/output (I/O) devices such as a keyboard 914, a cursor control device 916 (e.g., a mouse, a pointing device, pen and tablet, touch screen, multi-touch device, etc.) and a printer 928. In one or more embodiments, computer 902 may be coupled to, or may comprise, a portable or media viewing/listening device (e.g., an MP3 player, IPOD, NOOK, portable digital video player, cellular device, personal digital assistant, etc.), or image capture device 932/934 (e.g., a camera 932, 3D laser scanner 934, etc.). In yet another embodiment, the computer 902 may comprise a multi-touch device, mobile phone, gaming system, internet enabled television, television set top box, or other internet enabled device executing on various platforms and operating systems.

In one embodiment, the computer 902 operates by the hardware processor 904A performing instructions defined by the computer program 910 (e.g., a computer-aided design [CAD] application) under control of an operating system 908. The computer program 910 and/or the operating system 908 may be stored in the memory 906 and may interface with the user and/or other devices to accept input and commands and, based on such input and commands and the instructions defined by the computer program 910 and operating system 908, to provide output and results.

Output/results may be presented on the display 922 or provided to another device for presentation or further processing or action. In one embodiment, the display 922 comprises a liquid crystal display (LCD) having a plurality of separately addressable liquid crystals. Alternatively, the display 922 may comprise a light emitting diode (LED) display having clusters of red, green and blue diodes driven together to form full-color pixels. Each liquid crystal or pixel of the display 922 changes to an opaque or translucent state to form a part of the image on the display in response to the data or information generated by the processor 904 from the application of the instructions of the computer program 910 and/or operating system 908 to the input and commands. The image may be provided through a graphical user interface (GUI) module 918. Although the GUI module 918 is depicted as a separate module, the instructions performing the GUI functions can be resident or distributed in the operating system 908, the computer program 910, or implemented with special purpose memory and processors.

In one or more embodiments, the display 922 is integrated with/into the computer 902 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 902 according to the computer program 910 instructions may be implemented in a special purpose processor 904B. In this embodiment, some or all of the computer program 910 instructions may be implemented via firmware instructions stored in a read only memory (ROM), a programmable read only memory (PROM) or flash memory within the special purpose processor 904B or in memory 906. The special purpose processor 904B may also be hardwired through circuit design to perform some or all of the operations to implement the present invention. Further, the special purpose processor 904B may be a hybrid processor, which includes dedicated circuitry for performing a subset of functions, and other circuits for performing more general functions such as responding to computer program 910 instructions. In one embodiment, the special purpose processor 904B is an application specific integrated circuit (ASIC).

The computer 902 may also implement a compiler 912 that allows an application or computer program 910 written in a programming language such as C, C++, Assembly, SQL, PYTHON, PROLOG, MATLAB, RUBY, RAILS, HASKELL, or other language to be translated into processor 904 readable code. Alternatively, the compiler 912 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 910 accesses and manipulates data accepted from I/O devices and stored in the memory 906 of the computer 902 using the relationships and logic that were generated using the compiler 912.

The computer 902 also optionally comprises an external communication device such as a modem, satellite link, Ethernet card, or other device for accepting input from, and providing output to, other computers 902.

In one embodiment, instructions implementing the operating system 908, the computer program 910, and the compiler 912 are tangibly embodied in a non-transitory computer-readable medium, e.g., data storage device 920, which could include one or more fixed or removable data storage devices, such as a zip drive, floppy disc drive 924, hard drive, CD-ROM drive, tape drive, etc. Further, the operating system 908 and the computer program 910 are comprised of computer program 910 instructions which, when accessed, read and executed by the computer 902, cause the computer 902 to perform the steps necessary to implement and/or use the present invention or to load the program of instructions into a memory 906, thus creating a special purpose data structure causing the computer 902 to operate as a specially programmed computer executing the method steps described herein.

Computer program 910 and/or operating instructions may also be tangibly embodied in memory 906 and/or data communications devices 930, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 902.

Figure 10:
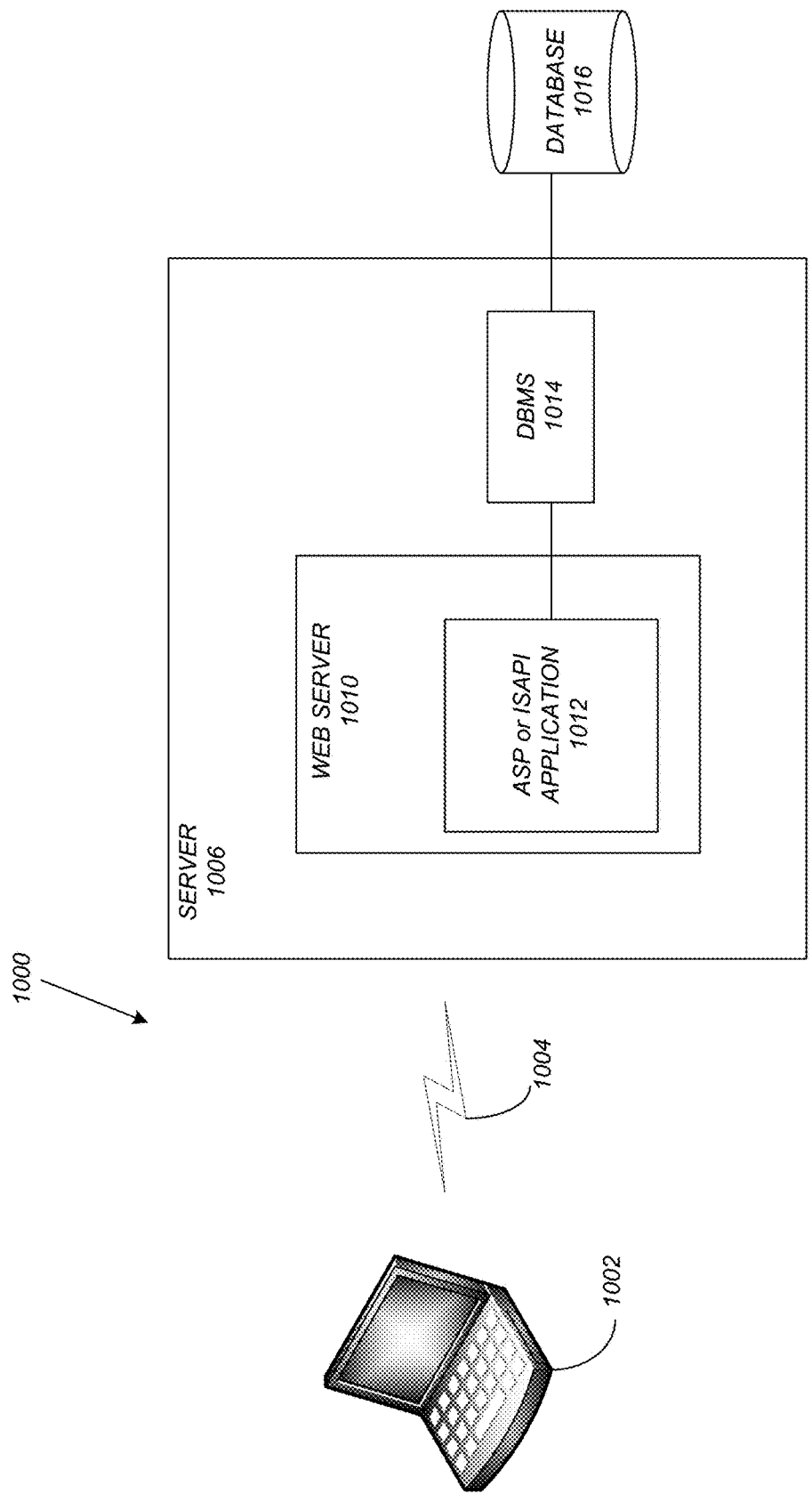
FIG. 10 schematically illustrates a typical distributed/cloud-based computer system using a network to connect client computers to server computers in accordance with one or more embodiments of the invention.

FIG. 10 schematically illustrates a typical distributed/cloud-based computer system 1000 using a network 1004 to connect client computers 1002 to server computers 1006. A typical combination of resources may include a network 1004 comprising the Internet, LANs (local area networks), WANs (wide area networks), SNA (systems network architecture) networks, or the like, clients 1002 that are personal computers or workstations (as set forth in FIG. 9), and servers 1006 that are personal computers, workstations, minicomputers, or mainframes (as set forth in FIG. 9). However, it may be noted that different networks such as a cellular network (e.g., GSM [global system for mobile communications] or otherwise), a satellite based network, or any other type of network may be used to connect clients 1002 and servers 1006 in accordance with embodiments of the invention.

A network 1004 such as the Internet connects clients 1002 to server computers 1006. Network 1004 may utilize ethernet, coaxial cable, wireless communications, radio frequency (RF), etc. to connect and provide the communication between clients 1002 and servers 1006. Further, in a cloud-based computing system, resources (e.g., storage, processors, applications, memory, infrastructure, etc.) in clients 1002 and server computers 1006 may be shared by clients 1002, server computers 1006, and users across one or more networks. Resources may be shared by multiple users and can be dynamically reallocated per demand. In this regard, cloud computing may be referred to as a model for enabling access to a shared pool of configurable computing resources.

Clients 1002 may execute a client application or web browser and communicate with server computers 1006 executing web servers 1010. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 1002 may be downloaded from server computer 1006 to client computers 1002 and installed as a plug-in or ACTIVEX control of a web browser. Accordingly, clients 1002 may utilize ACTIVEX components/component object model (COM) or distributed COM (DCOM) components to provide a user interface on a display of client 1002. The web server 1010 is typically a program such as MICROSOFT'S INTERNET INFORMATION SERVER.

Web server 1010 may host an Active Server Page (ASP) or Internet Server Application Programming Interface (ISAPI) application 1012, which may be executing scripts. The scripts invoke objects that execute business logic (referred to as business objects). The business objects then manipulate data in database 1016 through a database management system (DBMS) 1014. Alternatively, database 1016 may be part of, or connected directly to, client 1002 instead of communicating/obtaining the information from database 1016 across network 1004. When a developer encapsulates the business functionality into objects, the system may be referred to as a component object model (COM) system. Accordingly, the scripts executing on web server 1010 (and/or application 1012) invoke COM objects that implement the business logic. Further, server 1006 may utilize MICROSOFT'S TRANSACTION SERVER (MTS) to access required data stored in database 1016 via an interface such as ADO (Active Data Objects), OLE DB (Object Linking and Embedding DataBase), or ODBC (Open DataBase Connectivity).

Generally, these components 1000-1016 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1002 and 1006 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1002 and 1006. Embodiments of the invention are implemented as a software/CAD application on a client 1002 or server computer 1006. Further, as described above, the client 1002 or server computer 1006 may comprise a thin client device or a portable device that has a multi-touch-based display.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide the ability to automatically remove unwanted background elements that are reconstructed along with the subject of a scene. All image capture view profiles (Nadir, oblique, and façade) are all handled without any manual intervention due to the invention's adaptive nature. Embodiments of the invention may be utilized on any image capture devices that include depth maps (e.g., photogrammetry, laser scan point clouds, etc.).

The automatic removal of background objects provides multiple advantages. A first advantage is that the final reconstruction the user receives will be of higher visual quality and in line with a user expectation of keeping only the subject element and not the poorly reconstructed background elements (which require manual removal). A second advantage is that due to the removal of unnecessary elements, embodiments can accelerate the reconstruction pipeline since no wasted operation needs to be performed on the removed points. This in turn, enables increased responsiveness (to customers as compared to prior art methods) as well as lower cloud operating costs for reconstruction (as compared to prior art methods). Generally, embodiments of the invention enable both better and faster reconstruction as compared to prior art reconstruction methods.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for cropping a three-dimensional (3D) scene, comprising:
   (a) acquiring the 3D scene, wherein the 3D scene comprises:
      (i) multiple 3D images, wherein each 3D image is from a view angle of an image capture device; and
      (ii) a depth map for each 3D image, wherein the depth map comprises two or more depth values, wherein each of the two or more depth values is measured from the image capture device to an object in the 3D image;
   (b) sorting the two or more depth values for each 3D image resulting in a sorted depth map for each image;
   (c) determining multiple initial cutoff depths, wherein each of the multiple initial cutoff depths is based on the view angle;
   (d) determining a cutoff relaxation depth, wherein the cutoff relaxation depth is based on a jump, between two of the two or more depth values, that exceeds a jump threshold;
   (e) generating a confidence map for each depth map, wherein the confidence map indicates whether each depth value is above or below the cutoff relaxation depth;
   (f) generating an aggregated model that combines the confidence maps for all of the 3D images in the 3D scene;
   (g) generating a bounding volume out of the aggregated model; and
   (h) cropping out points from the 3D scene based on the bounding volume.

2. The computer-implemented method of claim 1, wherein:
   the 3D scene further comprises a position, a direction, and distortion information for the image capture device of each 3D image.

3. The computer-implemented method of claim 1, further comprising:
   determining the view angle based on a down vector corresponding to each 3D image.

4. The computer-implemented method of claim 1, wherein:
the determining multiple initial cutoff depths comprises determining, for each view angle, a cutoff penalty;
as the view angle moves from a Nadir view to an oblique view to a façade view, the cutoff penalty increases;
each initial cutoff depth is adjusted based on the cutoff penalty.

5. The computer-implemented method of claim 1, wherein:
the jump is determined based on a second derivative of a line between two adjacent depth values in the sorted depth map.

6. The computer-implemented method of claim 1, wherein the generating the confidence map comprises:
passing through each depth map and marking each pixel as a high confidence or a low confidence, wherein:
the pixel is marked as a high confidence if a corresponding depth value is below the cutoff relaxation depth; and
the pixel is marked as low confidence if the corresponding depth value is above the cutoff relaxation depth.

7. The computer-implemented method of claim 1, wherein the generating the aggregated model comprises:
aggregating projected 3D points of each 3D image into the aggregated model;
summing up confidence values, from the confidence maps, for each projected 3D point in the aggregated model;
removing the projected 3D points, from the aggregated model, that are below a confidence threshold.

8. The computer-implemented method of claim 1, wherein:
the bounding volume comprises a convex hull.

9. The computer-implemented method of claim 1, wherein the generating the bounding volume comprises:
accepting user input that scales the bounding volume.

10. A computer-implemented system for cropping a three-dimensional (3D) scene, comprising:
(a) a computer having a memory;
(b) a processor executing on the computer;
(c) the memory storing a set of instructions, wherein the set of instructions, when executed by the processor cause the processor to perform operations comprising:
(i) acquiring the 3D scene, wherein the 3D scene comprises:
(A) multiple 3D images, wherein each 3D image is from a view angle of an image capture device; and
(B) a depth map for each 3D image, wherein the depth map comprises two or more depth values, wherein each of the two or more depth values is measured from the image capture device to an object in the 3D image;
(ii) sorting the two or more depth values for each 3D image resulting in a sorted depth map for each image;
(iii) determining multiple initial cutoff depths, wherein each of the multiple initial cutoff depths is based on the view angle;
(iv) determining a cutoff relaxation depth, wherein the cutoff relaxation depth is based on a jump, between two of the two or more depth values, that exceeds a jump threshold;
(v) generating a confidence map for each depth map, wherein the confidence map indicates whether each depth value is above or below the cutoff relaxation depth;
(vi) generating an aggregated model that combines the confidence maps for all of the 3D images in the 3D scene;
(vii) generating a bounding volume out of the aggregated model; and
(viii) cropping out points from the 3D scene based on the bounding volume.

11. The computer-implemented system of claim 10, wherein:
the 3D scene further comprises a position, a direction, and distortion information for the image capture device of each 3D image.

12. The computer-implemented system of claim 10, wherein the operations further comprise:
determining the view angle based on a down vector corresponding to each 3D image.

13. The computer-implemented system of claim 10, wherein:
the determining multiple initial cutoff depths comprises determining, for each view angle, a cutoff penalty;
as the view angle moves from a Nadir view to an oblique view to a façade view, the cutoff penalty increases;
each initial cutoff depth is adjusted based on the cutoff penalty.

14. The computer-implemented system of claim 10, wherein:
the jump is determined based on a second derivative of a line between two adjacent depth values in the sorted depth map.

15. The computer-implemented system of claim 10, wherein the generating the confidence map comprises:
passing through each depth map and marking each pixel as a high confidence or a low confidence, wherein:
the pixel is marked as a high confidence if a corresponding depth value is below the cutoff relaxation depth; and
the pixel is marked as low confidence if the corresponding depth value is above the cutoff relaxation depth.

16. The computer-implemented system of claim 10, wherein the generating the aggregated model comprises:
aggregating projected 3D points of each 3D image into the aggregated model;
summing up confidence values, from the confidence maps, for each projected 3D point in the aggregated model;
removing the projected 3D points, from the aggregated model, that are below a confidence threshold.

17. The computer-implemented system of claim 10, wherein:
the bounding volume comprises a convex hull.

18. The computer-implemented system of claim 10, wherein the generating the bounding volume comprises:
accepting user input that scales the bounding volume.

* * * * *